(12) United States Patent
Wobak et al.

(10) Patent No.: US 9,755,679 B1
(45) Date of Patent: Sep. 5, 2017

(54) LOAD DEPENDENT RECEIVER CONFIGURATION

(71) Applicant: NXP B.V.

(72) Inventors: Markus Wobak, Graz-Puntigam (AT); Leonhard Kormann, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/206,146

(22) Filed: Jul. 8, 2016

(51) Int. Cl.
*H04B 1/40* (2015.01)
*H04B 1/14* (2006.01)
*H04B 5/00* (2006.01)

(52) U.S. Cl.
CPC .......... *H04B 1/14* (2013.01); *H04B 5/0031* (2013.01)

(58) Field of Classification Search
USPC ................. 455/77, 129, 41.1–41.3
See application file for complete search history.

(56) References Cited

U.S. PATENT DOCUMENTS

| | | | | |
|---|---|---|---|---|
| 6,965,837 B2* | 11/2005 | Vintola | ...................... | H03F 1/52 324/600 |
| 8,190,109 B2* | 5/2012 | Ali | .......................... | H01Q 1/243 455/123 |
| 8,626,083 B2* | 1/2014 | Greene | ................ | H04B 1/0458 315/151 |
| 2012/0071089 A1 | 3/2012 | Charrat | | |
| 2012/0295555 A1* | 11/2012 | Greene | .................. | H01Q 5/314 455/77 |
| 2014/0349593 A1* | 11/2014 | Danak | ...................... | H04B 1/40 455/77 |

OTHER PUBLICATIONS

U.S. Appl. No. 14/881,095, filed Oct. 12, 2015.

\* cited by examiner

*Primary Examiner* — Fayyaz Alam

(57) ABSTRACT

A communication device is disclosed. The communication device includes a receiver, a transmitter, a memory, a sensor to measure antenna detuning, a plurality of receiver configurations stored in the memory. Each of the plurality of receiver configurations include parameter-value pairs and a control unit, coupled to the sensor and the receiver, to select a receiver configuration from the plurality of receiver configurations based on an output of the sensor. The control unit is configured to alter a processing behavior of the receiver by altering values of receiver control parameters according to the parameter-value pairs.

17 Claims, 3 Drawing Sheets

| Config. ID | Rx | Parameter | Value |
|---|---|---|---|
| 1 | Digital | Freq Cutoff | |
| 1 | Analog | Gain | |
| 1 | Digital | | |
| 1 | Analog | | |
| 2 | Digital | | |
| 2 | Analog | | |
| 2 | Digital | | |
| 2 | Analog | | |
| 3 | Analog | | |

LOAD DEPENDENT RECEIVER CONFIGURATION

BACKGROUND

A Near Field Communication (NFC) or Radio Frequency Identification (RFID) communication system consists of two or more coupled resonant circuits. Those can be characterized by their resonance frequency, quality factors and coupling coefficients called system parameters.

The primary device (typically called "reader") generates a magnetic RF field. The counterpart (which can be for example a mobile phone, a tag or a transponder) can be supplied with power via this RF field. The primary device modulates the RF field's amplitude for communication purposes. In order to communicate back to the primary device, the counterpart load modulates the primary device's RF field. This can be achieved either by passive or active load modulation.

The first is done by varying one or more system parameter according to the respective modulation scheme. This can be for example switching a resistor parallel to the counterpart's antenna (quality factor modulation). Passive load modulation is preferred for passive counterparts which are powered by the primary device's RF field.

In the case of active load modulation as described in US Patent Publication No. 20120071089 A1: "Method and Device for Active Load Modulation by Inductive Coupling", the counterpart generates an RF field which is modulated according to the corresponding modulation scheme. Typically, the counterpart is a battery powered device. As a consequence, the modulation seen by the primary device can be by far stronger then by using passive load modulation.

System parameters and the selected method of load modulation affect the signal strength at the primary device's receiver input. Consequently, receiver units have to offer a large dynamic range in order to offer a stable communication performance for various counterparts featuring different types of antennas and modulation concepts.

NFC devices can act in initiator or target mode (e.g., ISO/IEC 18092 NFCP-IP1 or NFC Forum 2.0). In the initiator mode, the device generates an RF field (acts as a primary device") whereas in the target mode, the device is a counterpart to a primary device. NFC devices typically share a common RF receiver frontend configuration for a communication technology. Hence, the dynamic range requirements are increased even more.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a communication device is disclosed. The communication device includes a receiver, a transmitter, a memory, a sensor to measure antenna detuning, a plurality of receiver configurations stored in the memory. Each of the plurality of receiver configurations include parameter-value pairs and a control unit, coupled to the sensor and the receiver, to select a receiver configuration from the plurality of receiver configurations based on an output of the sensor. The control unit is configured to alter a processing behavior of the receiver by altering values of receiver control parameters according to the parameter-value pairs.

In some embodiments, the communication device further includes a second sensor coupled to the transmitter to measure a load on the transmitter. The control unit is further configured to select a receiver configuration from the plurality of receiver configurations based on an output of the second sensor. The receiver includes an analog receiver, an analog-to-digital converter (ADC) coupled to the analog receiver and a digital signal processing unit coupled to the ADC. The sensor is configured to monitor at least one of a voltage and a current in a signal path coupled to an antenna and matching network. The sensor or the control unit is configured to measure an amount of detuning based on a change in the monitored voltage or current. The second sensor is configured to monitor at least one of a voltage and a current in a signal path from the transmitter to an antenna and matching network. The second sensor or the control unit is configured to measure a load based on variable in the current or the voltage measured by the second sensor. A digital logic, coupled to the receiver and the transmitter, is included to process instructions embedded in an analog signal received by the receiver. The digital logic is further configured to generate instructions that are embedded in a transmitted analog signal by the transmitter. The receiver may include a sub-control unit coupled to the control unit. The sub-control unit is configured to transform control signals received from the control unit.

In another embodiment, a method of dynamically configuring a communication device including a receiver and a transmitter, is disclosed. The method includes measuring detuning of an antenna and matching network, selecting a receiver configuration from a plurality of receiver configurations based on the measuring of the detuning of the antenna and matching network. Each of the plurality of receiver configurations include parameter-value pairs. The method also includes configuring the receiver by altering values of receiver control parameters according to the parameter-value pairs.

In yet another embodiment, a communication device is disclosed. The communication device includes a receiver, a transmitter, a memory, a sensor to measure antenna detuning, a plurality of receiver configurations stored in the memory. Each of the plurality of receiver configurations include parameter-value pairs and a control unit, coupled to the sensor and the receiver, to select a receiver configuration from the plurality of receiver configurations based on an output of the sensor and a communication protocol. The control unit is configured to alter a processing behavior of the receiver by altering values of receiver control parameters according to the parameter-value pairs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Receiver units have to offer a large dynamic range in order to offer a stable communication performance for various counterparts featuring different types of antennas and modulation concepts. Implementing such devices increases circuit complexity, power consumption and most likely the size of the device. Embodiments described herein provide configurable parameters to control characteristics of a receiver unit. For example, based on a detection of particular type of counterpart device or signal strength or mistuning of antenna, control parameters may be changed to control filter cutoff frequencies, frequency thresholds, amplifier gains, etc. Preselected load detection ranges are stored in a memory and based on selected types of inputs falling within those ranges, corresponding configuration profiles are loaded to control receiver parameters. In some embodiments, these detection ranges and configurations may be programmed based on application requirements as for example, devices to be used in a particular environment (e.g., ambient temperatures, humidity and other environmental factors that affect signal propagation and antenna impedances) may be programmed using customized configurations according to the operating environment.

Figure 1:
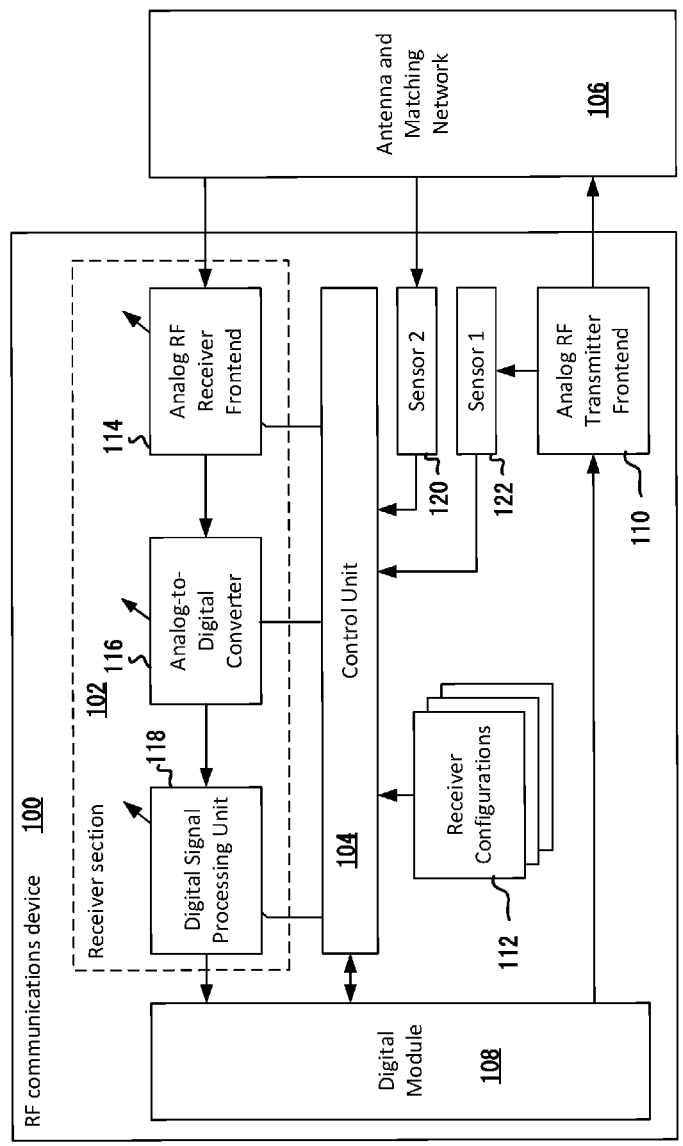
FIG. 1 depicts a Radio Frequency (RF) communication device in accordance of one or more embodiments.

FIG. 1 depicts a Radio Frequency (RF) communication device 100. The RF communication device 100 includes a digital module 108, a receiver section 102, a control until 104, a memory to store a plurality of configurations 112, an analog RF transmitter 110, one or more sensors 120, 122 and an antenna and matching network 106. The RF communication device 100 may include other components. However, those components have not been shown so as not to obfuscate the present disclosure.

The receiver section 102 includes an analog RF receiver 114, an analog-to-digital converter (ADC) 116 and a digital signal processing unit 118. The analog RF receiver 114 receives RF signals from the antenna network 106 and the ADC 116 converts the received signal into digital form. The digital signal processing unit 118 may include circuitry for different types of communication technologies (e.g., ISO/IEC 14443 Type-A, Type-B) and communication speed. The digital module 108 receives data transmitted from a counterpart device. Note that the data is encapsulated in received RF signals. The receiver section 102 is configured to retrieve the encapsulated data. The digital module 108 includes a logic to process the data according to the instructions in the received analog signal and if needed, send a response data back to the analog RF transmitter 110, which encapsulates the response data in a carrier wave and transmits the wave via the antenna network 106 to the counterpart device.

The ADC 116 receives analog signal after the received signal is filtered by the analog RF receiver 114. The resolution of the ADC 116 indicates the number of discrete values it can produce over the range of analog values. An appropriate resolution is set based on the frequency of the analog signal. The resolution can be controlled by the control unit 104 to achieve maximum possible average signal-to-noise ratio (SNR). The resolution is usually expressed in bits. In some embodiments, the sampling frequency of the ADC 116 is more than twice the frequency of the filtered analog signal that is outputted from the analog RF receiver 114. In other embodiments, the sampling frequency may be selected based on specific application requirements and a type of signal processing that needs to be performed by the digital signal processing unit 118. The digital signal processing unit 118 performs a numeric manipulation of the output of the ADC 116. After the filtered analog signal is converted into the digital form by the ADC 116, the digital signal processing unit 118 may analyze and manipulate the digitized signal typically to measure, filter, check data integrity or extract data embodied in the filtered analog signal. Mathematical concepts like correlation functions can be used to decode the data content from the received analog waveform. The detection strategy, its configuration and sensitivity thresholds can be configured via receiver configurations 112.

The digital module 108 includes application specific logic to act on the data extracted from the received analog signal and to produce a response to be sent back to the counterpart device (not shown) such as a base station in a vehicle (if the RF communication device 100 is a key fob) or a NFC counterpart, an NFC tag device, a key fob. In one example, the RF communication device 100 can be a Payment terminal (POS) and the communication counterpart may be a passive contact-less credit card or an NFC-enabled mobile phone. The RF communication device 100 may be either one of the counterpart devices (e.g., a base station or a handheld device that is configured to communicate with the base station). In some scenarios, the handheld counterpart device may be simply a device with active or passive tag which is read by the RF communication device 100.

The receiver section 102 of the RF Communication device 100 is designed to be controlled by the control unit 104, through a selected receiver configuration in the plurality of receiver configurations 112 to detect and correctly decode weak modulation that may be due to low coupling scenarios such as a vicinity coupling small tag antennas device based on ISO/IEC 15693 or ISO/IEC 18000:3.

In order to improve the receiver sensitivity of the receiver section 102, the ADC input signal range should be fully used. Based on the analog nature of the analog RF receiver 114, saturation and signal distortion effects may occur for stronger input signals. Consequently, communication stability in close distance can decrease and has to be balanced with the communication distance to weak modulating counterparts. Additionally, to comply with standards such as ISO/IEC 14443 and ISO/IEC 10373-6, a sensitive RF receiver configuration has to be chosen (e.g., large gain, low reception thresholds) but it may result in reception failures if a strongly modulating signal is encountered when a counterpart device is in a close distance. Therefore, in order to enable the RF communication device 100 to work with input signals of different modulating strengths, it is needed to select different receiver configurations based on the characteristics of the input analog signal.

The control unit 104 is provided to generate control signals to control signal processing characteristics of the receiver section 102. The control unit 104 may be a digital logic circuit or a programmable microcontroller based circuit. A memory is provided to store a plurality of receiver configurations 112. The receiver configurations 112 includes values of control parameters for the analog RF receiver 114. The receiver configurations 112 may also include values of control parameters for the digital signal processing unit 118. The values may include one or more of cutoff frequency ranges, receiver gain, ADC sampling rate, ADC resolution, clock speed for digital signal processing unit 118, etc. In some embodiment, these parameters and their values may be configured by application developers based on specific application requirements.

In some examples, to control the RF receiver 114, the receiver configurations 112 may include one or more parameters such as Signal attenuation strength, Signal amplification strength, Mixer sampling phase, Filter corner frequencies, bandpass filter parameters (bandwidth, center frequency), blanking of certain frequency components (notch filter frequency), in case of multiple RF inputs: source selection. Further, to control the ADC 116, the receiver configurations 112 may include one or more parameters such as ADC resolution and sampling frequency. To control the digital signal processing unit 118, the receiver configurations 112 may include one or more parameters such as Detection strategy/detection algorithm parameters namely: thresholds, correlation patterns, digital filter parameters (filter length, cutoff frequencies), in case of multiple channels: channel selection strategy. Note that a selection of parameters in the receiver configurations 112 may also depend on specific application design considerations. Therefore, additional or different control parameters according to application need may be incorporated in the receiver configurations.

Different blocks of the receiver section 102 are designed such that they are controllable based on control signals generated by the control unit 104 based on the parameter values stored in the receiver configurations 112. One or more sensors 120, 122 are provided to sense detuning of the antenna and load at both receiver and transmitter lines. The sensors 120, 122 may sense variations in current or voltage or both and provide the input to the control unit 104. Based on inputs from the sensors 120, 122, the control unit 104 selects one of the receiver profiles from the plurality of receiver profiles 112. The control unit 104 reads the parameters listed in the selected receiver profile and generates control signals for the receiver section 102. The receiver configurations 112 may include a section that maps sensor input value ranges to particular receiver configurations 112. Alternatively, the receiver profile selection logic can be programmed into the control unit 104.

The sensors 120, 122 are provided to detect the detuning of the antenna and matching network 106. Note that only one sensor 122 is required in some embodiments. The detuning may occur due to environmental causes as well as varying coupling load. The Sensor 122 monitors the analog RF transmitter (TX) current and/or voltage, so that a detuning of the antenna and matching network 106 can be detected by a change in the TX current and/or voltage. In another embodiment, only the sensor 120 is needed. The sensor 120 monitors a voltage or current of an antenna and matching network 106, so that a detuning of the antenna and matching network 106 can be detected by a change in the voltage or current of the antenna and matching network 106. In response to detection of the detuning, the control unit 104 selects an appropriate receiver configuration based on the selection criteria that matches the amount of detuning to a specific receiver configuration. In some other embodiments, both the sensors 120, 122 may be employed to select a receiver configuration based on outputs of both sensors 120, 122. In some embodiments, the sensors 120, 122 may be combined in one sensor.

Figure 2:
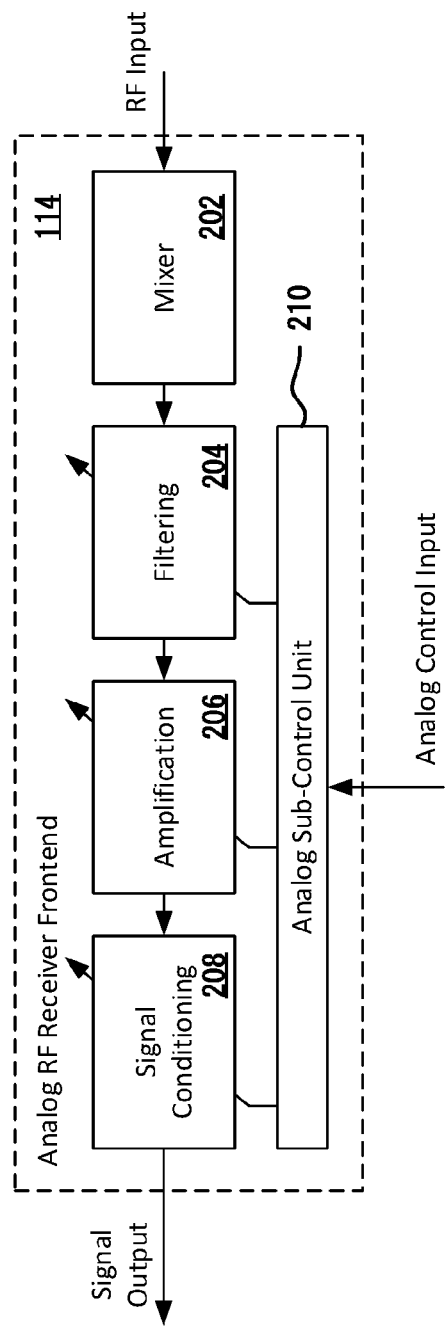
FIG. 2 illustrates an analog receiver component of the RF communication device in accordance with one or more embodiments of the present disclosure.

FIG. 2 illustrates the analog receiver 114 of the RF communication device 100. In one or more embodiments, the analog receiver 114 includes a mixer 202, a filter 204, an amplifier 206 and a signal conditioner 208. The analog receiver 114 may optionally also include an analog sub-control unit 210 that provides an interface to the control unit 104. The analog sub-control until 210 may be configured to translate control signals from the control unit 104. Having the analog sub-control unit 210 may be advantageous for the purpose of modularization of the RF communication device 100 design in that the analog RF receiver 114 may be designed independently yet still be able to be controlled by the control signals from the control unit 104 because the analog sub-control unit 210 can be designed to translate the control signals appropriately according to the internal component design of the analog receiver 114.

The received analog signal inputted to the analog receiver 114 typically goes through the mixer 202 first. The mixer 202 adds a frequency signal generated by another source, typically a local oscillator to shift the frequency of the received analog signal to a desired frequency range. The output of the mixer 202 is inputted to an analog filter 204, typically, to extract a frequency band. Filter cutoff frequencies, for example, may be controlled by a receiver configuration through the control unit 104. In other words, the cutoff frequencies of the filter 204 may be different based on the loaded receiver configuration.

The received signal, after filtering, is amplified by an amplifier 206. The amplifier gain, for example, may be controlled through control signals from the control unit 104 based on a loaded receiver configuration. The output of the amplifier 206 may be inputted to the signal conditioner 208 for manipulation to make the signal suitable for the next stage (e.g., ADC). The signal conditioning may include one or more of filtering, amplification and isolation processes.

Figures 3, 4:
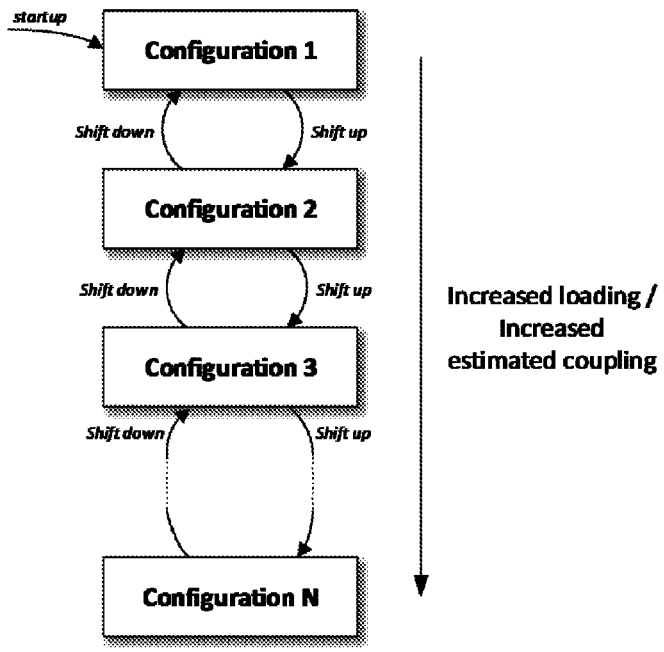
FIG. 3 shows transition of load configurations in accordance with one of more embodiments of the present disclosure.
FIG. 4 depicts a storage table for storing local configuration data in accordance with one of more embodiments of the present disclosure.

FIG. 3 illustrates transitioning of receiver configurations 112. A selected receiver configuration is loaded at the startup of the RF communication device 100. In some embodiments, the startup receiver configuration may be the last used receiver configuration before the RF communication device 100 was turned off last time. In other embodiments, a random receiver configuration may be used. In some other embodiments, a receiver configuration (among the plurality of receiver configurations 112) that is suitable for the weakest signal is used at the startup. In yet another embodiment, a receiver configuration that is suitable for the strongest signal is used at the startup.

During a use of the RF communication device 100, depending upon load coupling and detuning, an appropriate receiver configuration is selected based on preset logic. The logic for selecting a receiver configuration may include a lookup table that maps the amount of detuning, for example, to receiver configurations. The coupling and load is monitored continuously and depending upon the measured, transitioning from one receiver configuration to another is performed. In some embodiments, the transitioning does not need to be sequential. For example, receiver configuration 3 may be transitioned to receiver configuration 1 and vice versa.

FIG. 4 illustrates an example of a table structure for storing receiver configurations 112. A person skilled in the art would appreciate that the receiver configuration data may be stored in different memory structures such as key value pairs. The table shows in FIG. 4 may include one or more of a configuration identification, a module name to be controlled, a parameter name in the module and a value or a value range. For example, if receiver configuration 1 is loaded, gain of the amplifier 206 may be set the value listed in the value column.

In some embodiments, the table shown in FIG. 4 may include a column to store a communication protocol. In such embodiments, there are separate receiver configurations for different protocols such as ISO/IEC 14443 Type-A or Type-B 106 kbps, 212 kbps, NFC Forum NFC-A, NFC-B, NFC-F212, NFC-F424, ISO/IEC 15693 26 kbps, etc. A person skilled in the art would appreciate that the embodiments described herein may also be applicable to other communication protocols that are used in device to device communications. A control unit 104 is configured to select a receiver configuration from the receiver configurations 112 based on the output of the sensor or sensors 120, 122 as well as the communication protocol being used in the communication. In some embodiments, the protocol may be detected dynamically based on frequency bands (for example). However, in some other embodiments, the RF communication device 100 may be specifically configured to be used for a particular set of communication protocols.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A communication device, comprising:
    a receiver, wherein the receiver includes an analog RF receiver frontend, an analog-to-digital converter (ADC) coupled to the analog RF receiver frontend, and a digital signal processing unit coupled to the ADC;
    a transmitter comprising an analog RF transmitter frontend;
    a sensor to measure antenna detuning, wherein the sensor is configured to monitor at least one of a voltage and a current in a signal path coupled to an antenna and matching network;
    a memory;
    a plurality of receiver configurations stored in the memory, wherein each of the plurality of receiver configurations include parameter-value pairs; and
    a control unit, coupled to the sensor and the receiver, to select a receiver configuration from the plurality of receiver configurations based on an output of the sensor, wherein the control unit is configured to configure the receiver by altering values of receiver control parameters according to the parameter-value pairs.

2. The communication device of claim 1, further comprising a second sensor coupled to the transmitter to measure a load on the transmitter.

3. The communication device of claim 2, wherein the control unit is further configured to select a receiver configuration from the plurality of receiver configurations based on an output of the second sensor.

4. The communication device of claim 1, wherein the sensor or the control unit is configured to measure an amount of detuning based on a change in the monitored voltage or current.

5. The communication device of claim 2, wherein the second sensor is configured to monitor at least one of a voltage and a current in a signal path from the transmitter to an antenna and matching network.

6. The communication device of claim 5, wherein the second sensor or the control unit is configured to measure a load based on variations in the current or the voltage measured by the second sensor.

7. The communication device of claim 1, further including a digital logic, coupled to the receiver and the transmitter, to process instructions embedded in an analog signal received by the receiver.

8. The communication device of claim 7, wherein the digital logic is further configured to generate instructions that are embedded in a transmitted analog signal by the transmitter.

9. The communication device of claim 1, wherein the receiver includes a sub-control unit coupled to the control unit, wherein the sub-control unit is configured to transform control signals received from the control unit.

10. The communication device of claim 2, wherein a function performed by the second sensor is performed by the sensor.

11. A method of dynamically configuring a communication device including a receiver and a transmitter, the method comprising:
    measuring detuning of an antenna and matching network, wherein the measuring of the detuning includes monitoring one of a voltage and a current in a signal path coupled to the antenna and matching network;
    selecting a receiver configuration from a plurality of receiver configurations based on the measuring of the detuning of the antenna and matching network, wherein each of the plurality of receiver configurations include parameter-value pairs; and
    configuring the receiver by altering values of receiver control parameters according to the parameter-value pairs.

12. The method of claim 11, further comprising measuring a load on the transmitter.

13. The method of claim 12, further including selecting a receiver configuration from the plurality of receiver configurations based on the measuring the load on the transmitter.

14. The method of claim 12, wherein the measuring of the load includes monitoring at least one of a voltage and a current in a signal path from the transmitter to the antenna and matching network.

15. The method of claim 11, further including processing instructions embedded in an analog signal received by the receiver.

16. The method of claim 11, further including generating instructions that are embedded in a transmitted analog signal by the transmitter.

17. A communication device, comprising:
    an antenna and matching network;
    a receiver, wherein the receiver includes an analog RF receiver frontend, an analog-to-digital converter (ADC) coupled to the analog RF receiver frontend, and a digital signal processing unit coupled to the ADC;
    a transmitter comprising an analog RF transmitter frontend;
    a sensor to measure antenna detuning, wherein the sensor is configured to monitor at least one of a voltage and a current in a signal path between at least one of the receiver and the transmitter and the antenna and matching network;
    a memory;
    a plurality of receiver configurations stored in the memory, wherein each of the plurality of receiver configurations include parameter-value pairs; and
    a control unit, coupled to the sensor and the receiver, to select a receiver configuration from the plurality of receiver configurations based on an output of the sensor and a communication protocol, wherein the control unit is configured to configure the receiver by altering values of receiver control parameters according to the parameter-value pairs.

* * * * *